(12) United States Patent
Mills

(10) Patent No.: US 10,089,699 B1
(45) Date of Patent: Oct. 2, 2018

(54) VIRTUAL AUDITING SYSTEM AND METHOD

(71) Applicant: Carr Riggs & Ingram, LLC, Enterprise, AL (US)

(72) Inventor: David E. Mills, Enterprise, AL (US)

(73) Assignee: Carr Riggs & Ingram, LLC, Enterprise, AL (US)

( * ) Notice: Subject to any disclaimer, the term of this patent is extended or adjusted under 35 U.S.C. 154(b) by 0 days.

(21) Appl. No.: 15/612,638

(22) Filed: Jun. 2, 2017

Related U.S. Application Data

(60) Provisional application No. 62/349,008, filed on Jun. 12, 2016.

(51) Int. Cl.
*H04N 7/14* (2006.01)
*G06Q 40/00* (2012.01)
*H04N 7/15* (2006.01)

(52) U.S. Cl.
CPC ............. *G06Q 40/12* (2013.12); *H04N 7/142* (2013.01); *H04N 7/147* (2013.01); *H04N 7/15* (2013.01)

(58) Field of Classification Search
USPC ...................................................... 348/14.02
See application file for complete search history.

(56) References Cited

U.S. PATENT DOCUMENTS

| | | | | |
|---|---|---|---|---|
| 2002/0060697 | A1* | 5/2002 | Sasazaki | ............. H04L 12/1831 715/753 |
| 2007/0211140 | A1* | 9/2007 | Ohkawa | ................. H04N 7/147 348/14.01 |
| 2012/0296876 | A1* | 11/2012 | Bacinschi | ............... H04L 63/12 707/687 |

* cited by examiner

*Primary Examiner* — Amal Zenati
(74) *Attorney, Agent, or Firm* — Baker Donelson; Carl Davis

(57) ABSTRACT

A system for virtual auditing of a auditee by an auditing servicer having an organizer computer system that communicates through an electronic communications network with a microprocessor device at a remote auditee facility connected to a display and an imaging and sound device, whereby the organizer computer system remote from the auditee facility directs the imaging by the microprocessor device thereat for electronic face-to-face interaction of video, sound and exchange of electronic documents by the auditing servicer with personnel at the auditee facility. A method for virtual auditing of an auditee by an auditing servicer is disclosed.

20 Claims, 1 Drawing Sheet

VIRTUAL AUDITING SYSTEM AND METHOD

TECHNICAL FIELD

The present invention relates to apparatus and methods for conducting financial audits and reviews. More particularly, the present invention relates to apparatus and methods for conducting virtual financial audits with interactive bi-directional communications and exchanges of documents between an auditee client facility remote from the auditing servicer while providing compliance with conventional financial audit standards.

BACKGROUND OF THE INVENTION

Accounting professional services provide important financial, analysis, and reporting in support of business events, financial matters, and investor relations. Among the accounting services are typically three levels of financial examinations. These three are referred as audits, reviews, and examinations. An examination generally relates to an isolated evaluation and analysis of a particular issue, question or matter of interest to the client. In contrast, an audit involves detailed analysis and interrogations of clients, documents, records and systems. Among the purposes of auditing services is the authentication of the financial information of a company based on detailed analysis of selected documents and records.

Presently the in-depth and detailed evaluation required for auditing services typically occur on-site at client locations and may require several weeks or more of auditing personnel time on-site. These on-site services involve face-to-face meetings, consultations, and interactions with individuals, small groups, or larger groups. In addition to conferences and meetings, the auditing servicers also receive, review and analyze documents and reports prepared by the company during its ordinary operations. Many of such documents are contained in electronic files and databases of the company.

While onsite auditing services provides opportunity for interpersonal conferences, analysis and support for auditing services of financial information of companies, there are drawbacks to such long-term assignments. Particularly, significant auditing services typically involve long-term assignments for on-site work and meetings. These long term assignments also involve significant costs for lodging and meals of auditing personnel and staff, as well as expenses for travel to distant company facilities being audited. Such busy assignment schedules also interfere with family and personal nonworking activities and often the accounting professionals miss family events due to work requirements.

Accordingly, there is a need in the accounting services profession for an improved apparatus and method for facilitating auditing services while reducing the problems associated with long-term auditing services assignments. It is to such that the present invention is directed.

SUMMARY OF THE INVENTION

The present invention meets the need in the art for a system for virtual auditing of an auditee by a remote auditing servicer, comprising an electronic communications network for communicating between a plurality of computer systems each having a communicator for connecting thereto including an organizer computer system of a remote auditing servicer. A microprocessor device has a first port for connecting to a display at an auditee facility remote from the organizer computer system, a second port that communicates with an audio visual imaging device, and a communicator configured for bi-directional communications between the microprocessor device and the organizer computer system through the electronic communications network. The audio visual imaging device disposed at the auditee facility configured for receiving sound and visual signals thereat and communicating electronic representations of said sound and visual signals by the microprocessor device to the organizer computer system through the electronic communications network. The organizer computer system further configured for directing the operation of the audio visual imaging device and further comprising a first input device for operating the microprocessor device with commands communicated through the electronic communications network, a display for displaying the electronic representations of the images received by the imaging device and communicated through the electronic network to the organizer computer system, and speaker for sounding the electronic representations of the sound signals received by the imaging device and communicated through the electronic network to the organizer computer system. The organizer computer system remote from the auditee facility directs the imaging by the microprocessor device thereat for electronic face-to-face interaction by the auditing servicer with others at the auditee facility for communication of images, sound, and electronic documents.

In another aspect, the present invention provides a method for virtual auditing by a remote auditing servicer of a auditee, comprising the steps of:

(a) providing an electronic communications network for communicating between a plurality of computer systems each having a communicator for connecting thereto including an organizer computer system of an auditing servicer;

(b) providing to an auditee a microprocessor device having a first port for connecting to a display at an auditee facility remote from an organizer computer system, a second port that communicates with an audio visual imaging device, and a communicator configured for bi-directional communications between the microprocessor device and the organizer computer system through an electronic communications network, (c) disposing the audio visual imaging device at the auditee facility for receiving sound and visual signals thereat and communicating electronic representations of said sound and visual signals by the microprocessor device to the organizer computer system through the electronic communications network;

(d) operating a software application on the organizer computer system configured for directing the operation of the audio visual imaging device with a first input device for operating the microprocessor device with commands communicated through the electronic communications network;

(e) displaying on a respective display connected to a respective one of the computer systems the electronic representations of the images received by the imaging device and communicated through the electronic network to the organizer computer system; and (f) sounding through a respective speaker the electronic representations of the sound signals received by the imaging device and communicated through the electronic network to the organizer computer system, whereby the organizer computer system remote from the facility directs the imaging by the microprocessor device thereat for electronic face-to-face interaction by an auditor with personnel at the auditee facility.

Other features, advantages, and benefits of the system for virtual auditing will become apparent upon a reading of the following detailed description in reference to the drawings and the appended claims.

DETAILED DESCRIPTION

Figure 1:
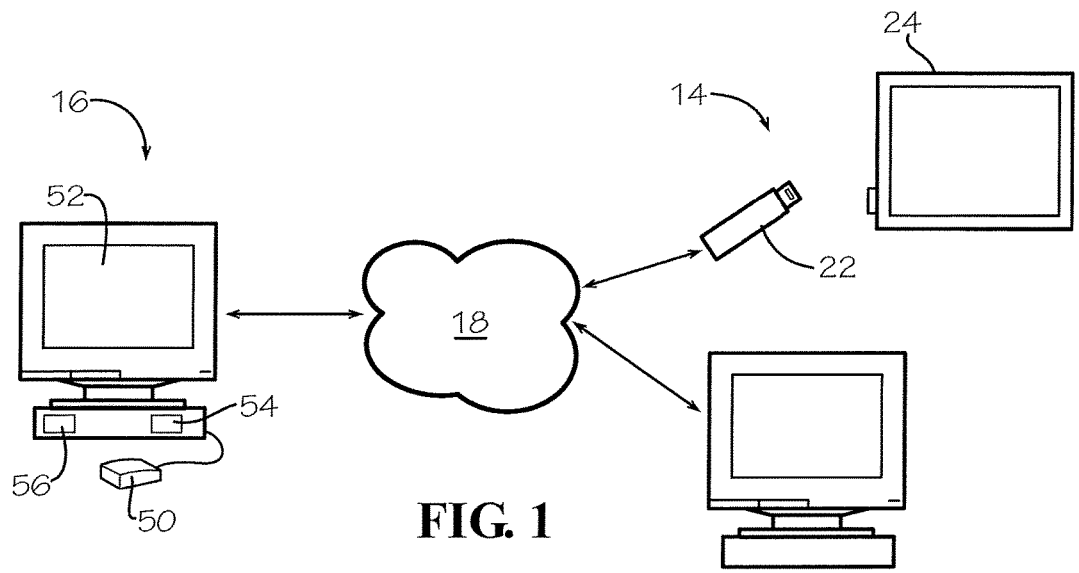
FIG. 1 illustrates a system for virtual auditing communications between a company and a remote audit servicer in accordance with an embodiment of the present invention.

With reference to the drawings in which like parts have like reference numerals, FIG. 1 illustrates a virtual audit system 10 in accordance with the present invention for virtual auditing of a company or auditee 14 by a remote accounting auditing servicer 16 operative within an interactive electronic communication network 18. The electronic communications network 18 includes communications devices and software configured for communicating electronic messages, documents and information between computer systems of the company 14 and the accounting auditing servicer 16 remote from the auditee company. In the illustrated embodiment, the respective computer systems are conventional personal microprocessor computers configured with application software for interactive communications and exchange of electronic documents, images and audio, including transmission of electronic files and visual and audio signals generated from imaging or camera video devices and microphones.

Figure 2:
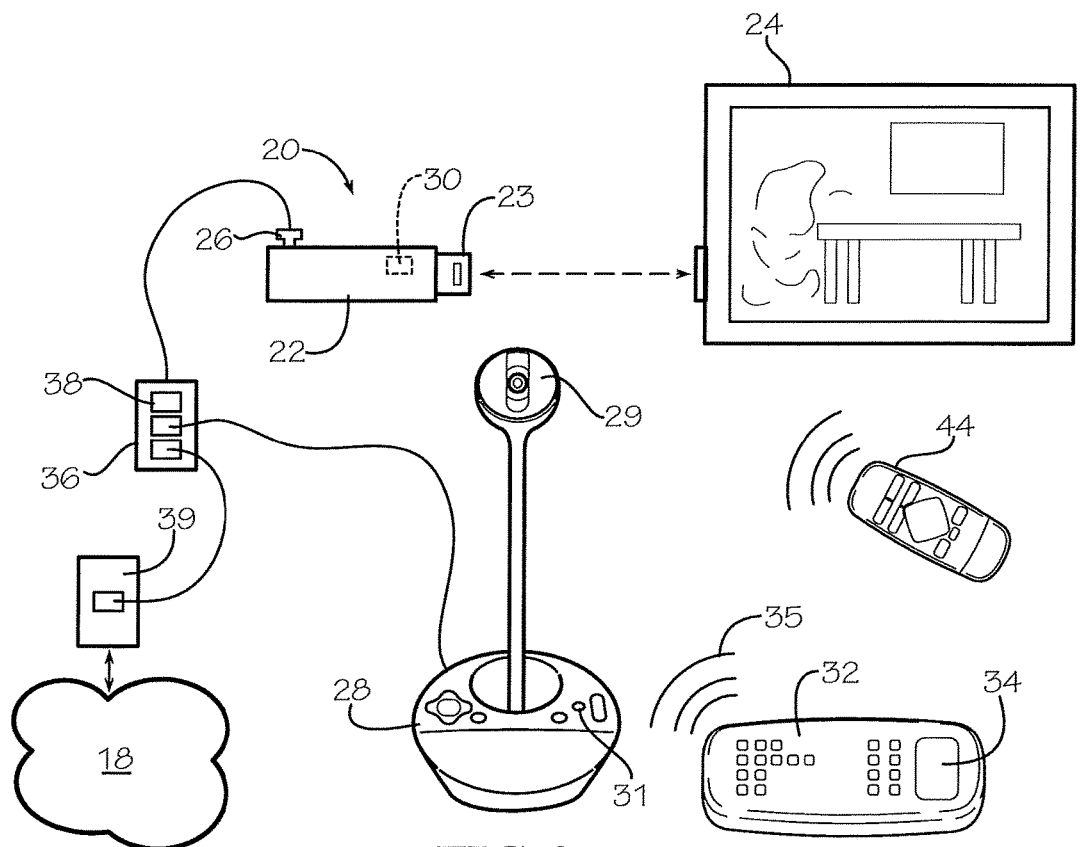
FIG. 2 illustrates an apparatus for virtual auditing of a company by a remote accounting servicer within the system illustrated in FIG. 1.

With reference to FIG. 2, in accordance with the present invention, the accounting servicer 16 provides a kit generally 20 of equipment necessary for the auditee company 14 to install at a company facility such as a meeting room or other site. The kit 20 enables the auditing servicer 16 to interactively engage remotely in the virtual audit with the auditee company 14 through the virtual audit system 10. The kit 20 includes a microprocessor device 22 having a conventional microprocessor and electronic memory for holding computer software that upon execution operates for interactive communications between the remote auditing servicer 16 and the auditee 14. A first port 23, for example, an HDMI port, of the microprocessor device 22 provides for connecting the microprocessor device 22 to a display such as a television or video monitor device 24 at the auditee facility. A second port 26 of the microprocessor device 22 communicates with an audio visual imaging device 28. In the illustrated embodiment, the imaging device 28 includes a visual imager 29 such as a CCD device, a video camera, or a high definition wide angle video camera, as well as a microphone 31 for receiving sound.

A communicator 30 is configured for communications between the microprocessor device 22 and the organizer computer system through the electronic communication network 16. A keyboard 32 and mouse or trackpad 34 enable entry of information or selection of commands for operation of the kit 20. Preferably, the keyboard 32 and mouse 34 are wireless 35, such as Bluetooth or similar communications, but may be wire or cable connected to the microprocessor device 22. The illustrated embodiment also provides as an alternate a hub device 36 providing a plurality of ports generally 38 and a connector 40 for connecting the hub device 36 to the microprocessor 22. The other ports 38 allow connecting other devices such as a wired keyboard to the microprocessor 22. The microprocessor 22 connects to the network 18 such as by an Ethernet connection 39 (wired or wireless). The microprocessor device 22 and the imaging device 28 connect to a supply of electrical current. In the practice of the invention, the accounting servicer 16 provides the kit 20 to the auditee company 14.

The audio visual imaging device 28 is readily positioned at the auditee 14 facility for receiving sound and visual signals and communicating electronic representations of the sound and visual signals by the microprocessor device 22 to the organizer computer system through the electronic communications network 18. In the illustrated embodiment, the audio visual imaging device 28 includes a remote control 44 for selective operation of the audio visual imaging device 28 including the camera (wide angle or zoom as well as pan for orienting the camera such as to a table or exhibit within the room at the auditee facility) and for operating the sound receiving system or microphone (on/off selectively). In the illustrated embodiment, the audio visual device 28 communicates by a wire or cable with the microprocessor device 22, but in an alternate embodiment, the audio visual imaging device 28 communicates wirelessly such as by a Bluetooth communicator to the microprocessor device 22.

The kit 20 in an illustrative embodiment uses a HDMI computer stick or microprocessor device 22 that connects to a LOGITECH BCC950 webcam speaker phone device (operable locally at the auditee facility via a wireless remote) and communicates with a Bluetooth keyboard and trackpad input device. For imaging of conferences, the video imaging device 28 preferably features auto-focusing, HD 1080p, 30 frames-per-second video imaging with a full-duplex speakerphone audio for small-group conferencing. The resulting signals representative the visual images and the sound (i.e., the discussions and conversations) provide high quality video and audio signals appropriate for electronic storage for subsequent review, referral and use. An elongated connector cable allows selective positioning of the imaging device 28 within the conference room of the auditee 14 for imaging of conferences. The remote control 44 operates the imaging device 28 for a selective field of view and for video pan, tilt, and zoom features.

The microprocessor device 22 may be configured for wired or wireless connection to the electronic network 18. The microprocessor device 22 includes software for interactive conferencing and meetings, for example, GOTOMEETING application software, or the like. The application software upon execution allows linking the distal computer systems of the auditing servicer 16 and the remote auditee company 14 through the network 18. Each computer system includes imaging and sound devices by which conference images and discussion communicate between the auditing servicer 16 and the remote auditee company 14. The software is further configured for selection and display of electronic files and exchange of selected electronic files between the auditing servicer 16 and the remote auditee company 14. For example, but not illustrated, at least one third computer system may be engaged through the electronic network 18 with the auditing servicer 16 and the remote auditee company 14, for a plurality of participants engaged in the virtual audit service. Electronic files held in an electronic storage device of the third computer system may be selected and communicated to the auditing servicer 16 and to the auditee company 14.

The auditing servicer 16 operates the organizer computer system which is configured with meeting software for coordinating the joinder of the auditee computer system as well as computer systems of others (for example, but limitation, of auditor personnel, auditee personnel, and consultants as may be required from time-to-time). The organizer computer system in an alternate embodiment directs the operation of the audiovisual imaging device 28 placed at the auditee facility, for example, operating the video imaging device 28. The organizer computer system further comprises a first input device 50 for operating the microprocessor device 20 with commands communicated from the organizer computer system through the electronic communications network 16 to the microprocessor 20. A display 52 displays the electronic representations of the images received by the audio visual imaging device 28 that communicate through the electronic network 18 to the organizer computer system. In addition, a speaker 54 provides for the sound of the sound signals received by the imaging device 28. The professionals of the auditing servicer 16 remote from the personnel of the auditee 14 nevertheless interactively engage in traditional audit services, consultations, and testing by using the system 10. The organizer computer system further includes electronic memory or data file storage devices 56 for selective storage of documents and conference audio and visual signals.

With reference to FIG. 2, the system 10 operates in response to the auditing servicer 16 providing the kit 20 to the auditee 14. The auditee 14 provides a conference room equipped with the display 24 and network 18 connections (wired or wireless, for example, Ethernet). Preferably, the electronic network 18 is encrypted for secure communications. The microprocessor device 22 connects through the port 22 to an HDMI connection of the display 24. The display 24 presents on the screen the operating images of the software. The audio visual imaging device 28 connects through a USB (or other connector) to the microprocessor device 22. The personnel then boot the microprocessor device 22 and selectively operate the meetings software for linking of the auditee 14 computer system through the electronic network 18 with the computer system of the auditing servicer 16. In an alternate embodiment, the hub device 36 connected to the second port 26 connects to a wired keyboard and/or mouse for selective operation of the microprocessor device 22. The imaging device 28 operates to receive video images and sound, which signals communicate through the communicator 30 with the electronic communication network 18 for communications between the microprocessor device 22 and the organizer computer system.

The organizer computer system operated by the auditing servicer 16 may engage in meetings with one or more individuals, with small groups, and with larger groups. The computer system is configured with software for selectively recording video and audio of meetings and conferences on an electronic storage device. Similarly, electronic documents may communicate selectively from the auditee computer system to the auditing servicer 16 for storage on an electronic storage device. A feature of the meetings software configuration is selectively sharing of computer screens, selectively granting one of the interconnected computers presentation rights, and a white board function by which notes are displayed on the displays of the interconnected computer systems and documents may be annotated and saved to an electronic storage device or printed to a system printer.

The system 10 provides for reduced travel requirements for auditing services professionals and improves use of time for both auditee and auditor through efficient scheduling of conferences, procedures and testing of financial information, and reduced wasted time arising from unexpected events that would prevent a meeting or conference. Planning is enhanced for executing fieldwork with more clearly defined testing. Recorded sessions may be reviewed for analysis and evidentiary support as well as training. Subject matter experts may be gainfully used with reduced travel and without geographic restrictions. Multiple client locations that are geographically dispersed may be readily serviced. The system provides improved auditing services collaboration.

It is thus seen that the foregoing describes a system that provides for multiple remote computer systems to interactively and selectively engage during the conduct of a virtual audit of an auditee by auditing servicers with multiple auditee personal as participants from remote separate locations, featuring secure exchange of video and audio as well as communication of documents that are readily recorded in electronic storage while reducing travel, cost, and time drawbacks arising from long-term audit service deployments. While this invention has been described in detail with particular reference to the preferred embodiments thereof, the principles and modes of operation of the present invention have been described in the foregoing specification. The invention is not to be construed as limited to the particular forms disclosed because these are regarded as illustrative rather than restrictive. Moreover, those skilled in the art may make modifications, variations and changes thereto without departure from the spirit and scope of the invention as described by the following claims.

What is claimed is:

1. A system for virtual auditing of a auditee by a remote auditing servicer, comprising:

an electronic communications network for communicating between a plurality of computer systems each having a communicator for connecting thereto including an organizer computer system of an auditing servicer;

a microprocessor device having a first port for connecting to a display at an auditee facility remote from the organizer computer system, a second port that communicates with an audio visual imaging device, and a communicator configured for bi-directional communications between the microprocessor device and the organizer computer system through the electronic communications network, the audio visual imaging device disposed at the auditee facility for receiving sound and visual signals thereat and communicating electronic representations of said sound and visual signals by the microprocessor device to the organizer computer system through the electronic communications network;

the organizer computer system configured for directing the operation of the audio visual imaging device and further comprising:

a first input device at the organizer computer system for operating the microprocessor device at the auditee facility remote from the organizer computer system with commands communicated through the electronic communications network;

a display at the organizer computer system for displaying the electronic representations of the images received by the imaging device at the auditee facility and communicated through the electronic network to the organizer computer system;

a speaker at the organizer computer system for sounding the electronic representations of the sound signals received by the imaging device at the auditee facility and communicated through the electronic network to the organizer computer system, whereby the organizer computer system remote from the facility directs the imaging by the microprocessor device thereat for electronic face-to-face interaction by an auditor with personnel at the auditee facility.

2. The system as recited in claim 1, further comprising an electronic storage device for recording selectively the sound and images signals received by the audio and visual imaging device and communicated through the electronic network to the organizer computer system.

3. The system as recited in claim 1, further comprising an output device for generating a work embodying either the sound signals or the images signals received by the audio and visual imaging device and communicated through the electronic network to the organizer computer system.

4. The system as recited in claim 1, further comprising a plurality of display screens, each selectively configured for display of a selected image, a respective one of the display screens operatively connected to a respective one of the computer systems.

5. The system as recited in claim 1, further comprising at least one attendee computer system selectively joined through the electronic communications network for communication with the organizer computer system and the microprocessor device, the attendee computer system having a speaker and a display for presentation of the sound signals and image signals of the audio visual imaging device.

6. The system as recited in claim 1, wherein the audio visual imaging device communicates by a wireless signal with the second port.

7. The system as recited in claim 1, wherein the audio visual imaging device connects to the second port by a communications cable.

8. The system as recited in claim 1, further comprising a second input device that communicates with the microprocessor device.

9. The system as recited in claim 8, wherein the first input device is a keyboard.

10. The system as recited in claim 9, wherein the keyboard is wireless.

11. The system as recited in claim 1, further comprising a controller for operating the audio visual imaging device.

12. The system as recited in claim 11, wherein the controller comprises a separate device configured for locally operating the audio visual imaging device.

13. The system as recited in claim 11, wherein the controller comprises a module configured by the organizer computer system for operating the audio visual imaging device.

14. The system as recited in claim 1, further comprising a second audio and video imager for imaging proximate the organizer computer system, which organizer audio and video images communicate to the microprocessor device through the electronic communications network for presentation thereof on the display at the auditee facility.

15. A method for virtual auditing by a remote auditing servicer of a auditee, comprising the steps of:

(a) providing an electronic communications network for communicating between a plurality of computer systems each having a communicator for connecting thereto including an organizer computer system of an auditing servicer;

(b) providing to an auditee a microprocessor device having a first port for connecting to a display at an auditee facility remote from an organizer computer system, a second port that communicates with an audio visual imaging device, and a communicator configured for bi-directional communications between the microprocessor device and the organizer computer system through an electronic communications network, (c) disposing the audio visual imaging device at the auditee facility for receiving sound and visual signals thereat and communicating electronic representations of said sound and visual signals by the microprocessor device to the organizer computer system through the electronic communications network;

(d) operating a software application on the organizer computer system configured for directing the operation of the audio visual imaging device with a first input device at the organizer computer system for operating the microprocessor device at the auditee facility remote from the organizer computer system with commands communicated through the electronic communications network;

(e) displaying on a respective display at the organizer computer system the electronic representations of the images received by the imaging device at the auditee facility and communicated through the electronic network to the organizer computer system; and (f) sounding through a speaker at the organizer computer system the electronic representations of the sound signals received by the imaging device at the auditee facility and communicated through the electronic network to the organizer computer system, whereby the organizer computer system remote from the facility directs the imaging by the microprocessor device thereat for electronic face-to-face interaction by an auditor with personnel at the auditee facility.

16. The method as recited in claim 15, further comprising the step of selectively storing in an electronic memory device the sound and images signals received by the audio and visual imaging device and communicated through the electronic network to the organizer computer system.

17. The method as recited in claim 15, further comprising the step of generating with an output device a work embodying either the sound signals or the images signals received by the audio and visual imaging device and communicated through the electronic network to the organizer computer system.

18. The method as recited in claim 15, further comprising the step of joining at least one attendee computer system through the electronic communications network for communication with the organizer computer system and the microprocessor device, the attendee computer system having a speaker and a display for presentation of the sound signals and image signals of the audio visual imaging device.

19. The method as recited in claim 15, further comprising the step of providing a controller for operating the audio visual imaging device.

20. The method as recited in claim 15, further comprising the step of imaging with a second audio and video imager connected to the organizer computer system, which organizer audio and video images communicate to the microprocessor device through the electronic communications network for presentation thereof on the display at the auditee facility.

\* \* \* \* \*

UNITED STATES PATENT AND TRADEMARK OFFICE
CERTIFICATE OF CORRECTION

PATENT NO. : 10,089,699 B1  
APPLICATION NO. : 15/612638  
DATED : October 2, 2018  
INVENTOR(S) : David E. Mills Page 1 of 1

It is certified that error appears in the above-identified patent and that said Letters Patent is hereby corrected as shown below:

In the Specification

Column 2, Line 30, change "for virtual auditing by a remote auditing servicer of a" to -- for virtual auditing by a remote auditing servicer of an --.

Column 2, Line 38, change "facility remote from an organizer computer system, a second" to -- facility remote from the organizer computer system, a second --.

In the Claims

Column 7, Line 59, change "servicer of a auditee, comprising the steps of" to -- servicer of an auditee, comprising the steps of --.

Column 8, Line 1, change "auditee facility remote from an organizer computer" to -- auditee facility remote from the organizer computer --.

Signed and Sealed this
Eleventh Day of December, 2018

Andrei Iancu
*Director of the United States Patent and Trademark Office*